(No Model.)
G. E. WITHERELL.
TURRET TOOL MACHINE.
No. 511,829. Patented Jan. 2, 1894.
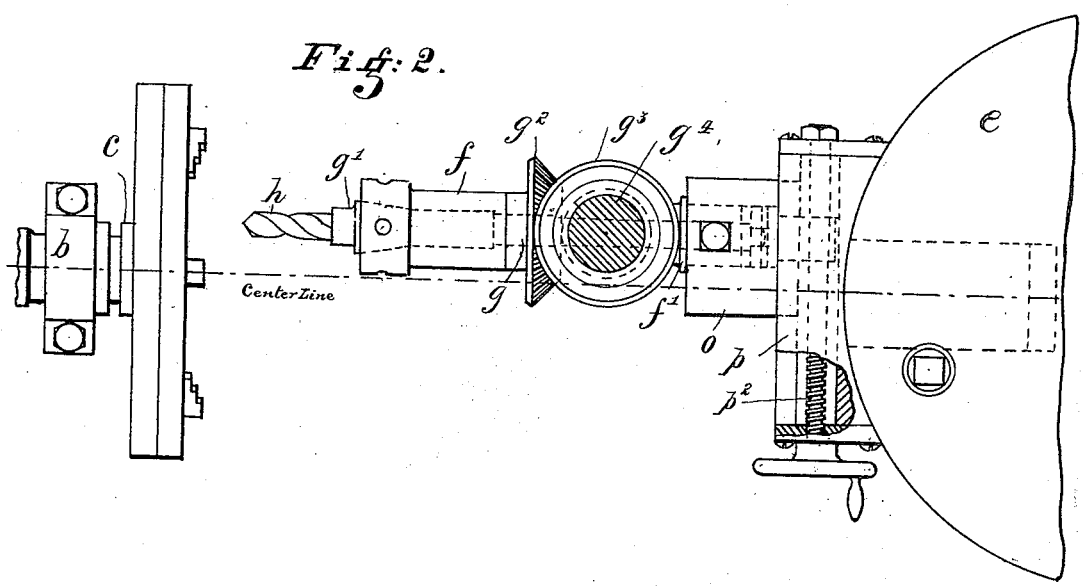
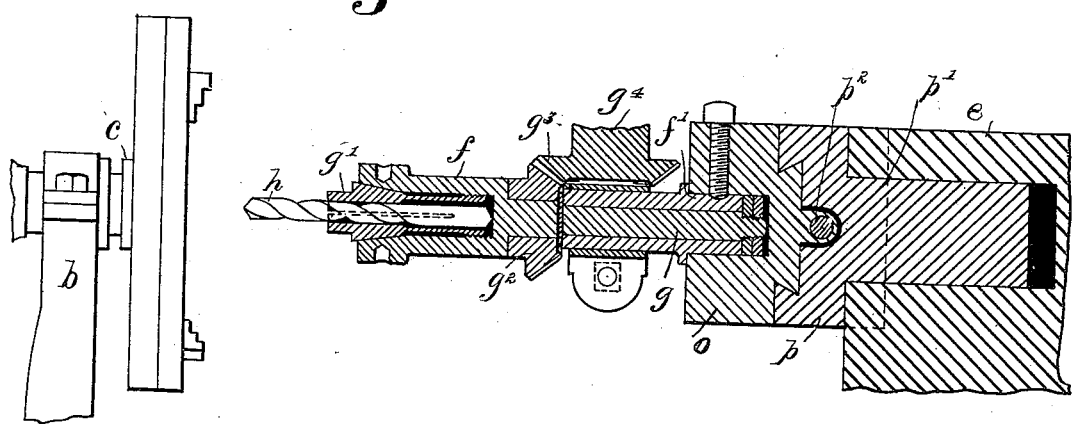
Witnesses:
Emory C. Whitney
Joseph Arth. Gantin
Inventor.
George E. Witherell,
By Chas. L. Burdett,
Attorney.

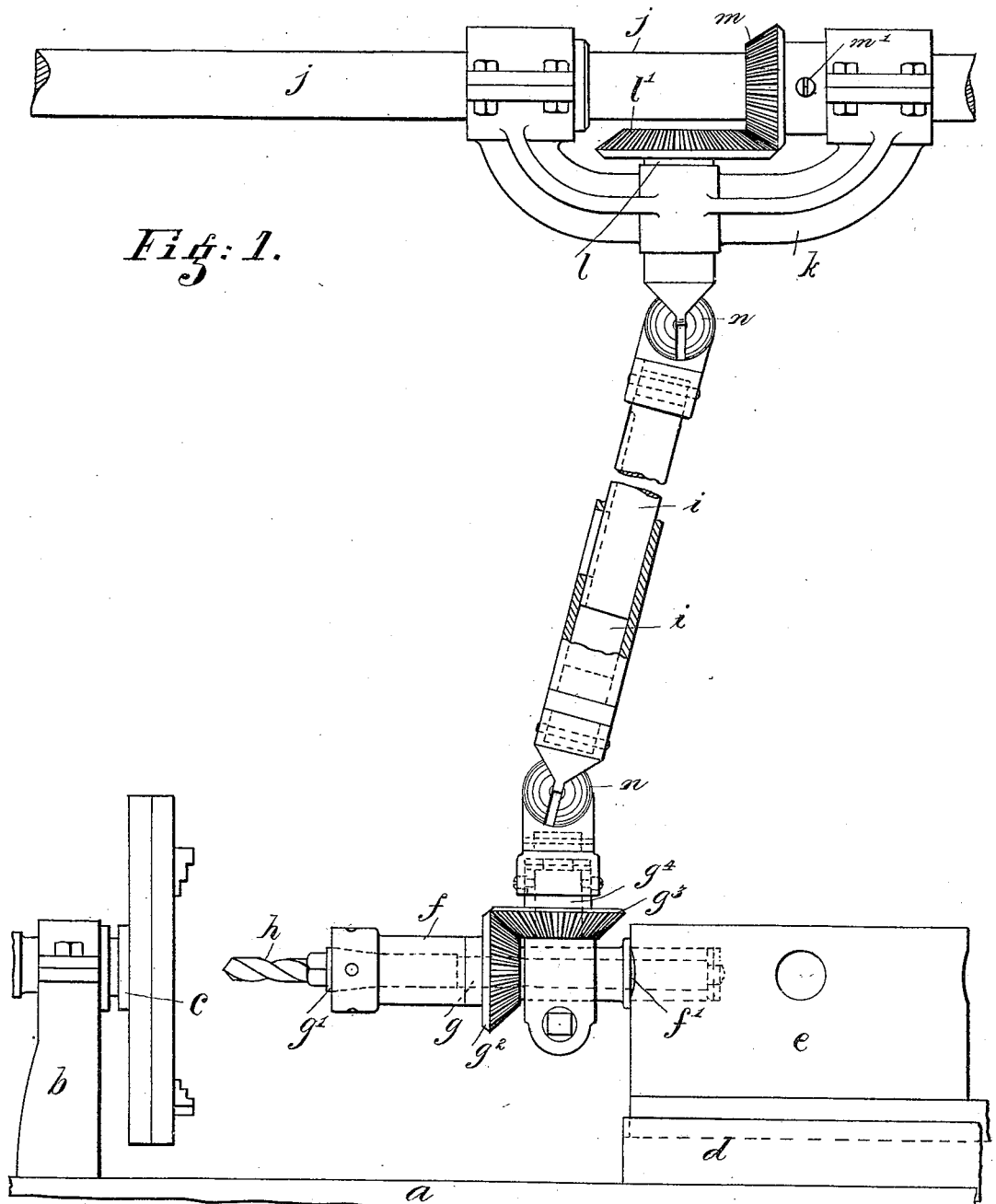

UNITED STATES PATENT OFFICE.

GEORGE E. WITHERELL, OF HARTFORD, CONNECTICUT, ASSIGNOR TO THE HARTFORD MACHINE SCREW COMPANY, OF SAME PLACE.

TURRET-TOOL MACHINE.

SPECIFICATION forming part of Letters Patent No. 511,829, dated January 2, 1894.

Application filed March 13, 1893. Serial No. 465,854. (No model.)

*To all whom it may concern:*

Be it known that I, GEORGE E. WITHERELL, of Hartford, in the county of Hartford and State of Connecticut, have invented certain new and useful Improvements in Turret-Tool Machines, of which the following is a full, clear, and exact description, whereby any one skilled in the art can make and use the same.

My invention relates to the general class of automatic machine tools in which a revoluble turret is employed to hold the various shaping tools that are brought in succession to bear upon the work which is held and moved by the live spindle of the machine.
The object of my invention is to provide a turret tool that is capable of being driven by means of mechanism independent of the live spindle or its immediate driving means.

To this end my invention consists of the several parts making up the tool as a whole and in the combination of such parts with the revoluble turret of the machine tool and with the driving mechanism as more particularly hereinafter described and pointed out in the claims.

Referring to the drawings: Figure 1 is a view in front elevation of the tool driving fixture showing the connections to the countershaft and turret tool. Fig. 2 is a detail top or plan view of part of the turret and my improved tool. Fig. 3 is a detail view in vertical central section through the tool.

In machines in connection with which a revoluble turret is used it has been customary to hold the tool against rotary movement and to move the work supported on the live spindle against the tool, the speed at which the live spindle of the tool is driven depending on the shape and size of the cutting tool and work to be done by it. The proper speed for meeting the requirements of certain of the shaping tools is not the proper speed for a boring tool of different size and one of the objects of my invention is to provide means for driving the tool while held in the turret in a direction opposite to that in which the live spindle is driven as by this means full advantage of the mechanism is taken to obtain the needed speed for the special tool that is thus driven.

In the accompanying drawings the letter $a$ denotes the bed or frame of a machine tool usually called a screw machine and on this bed is mounted the head $b$ which supports the live spindle $c$ and means for driving it. A carriage $d$ is movably supported on the bed and is capable of a reciprocating movement toward and from the head; on this carriage is supported the revoluble turret $e$, these parts being of any ordinary construction.

In carrying out my invention a tool holder $f$ with a shank $f'$ which may be inserted in a socket in the turret and clamped therein by the usual means is provided. This holder $f$ supports a spindle $g$ having a chuck $g'$ or like means of securing a tool, as a boring tool $h$, in the end of the spindle and projecting in the direction of its axis. In the form shown a gear wheel $g^2$ is secured to the spindle $g$ while a gear $g^3$ in mesh with the gear $g^2$ is supported on a shaft $g^4$ that projects beyond the holder $f$. Both these gears are beveled and are in mesh with each other so that when the shaft $g^4$ is driven the boring tool will be turned by the intermediate mechanism described. A flexible connecting rod $i$ unites the tool spindle $g$ and a countershaft $j$ from which the former is driven.

In order to enable the device to be readily connected to a countershaft I make use of a yoke $k$ having the end of its arms provided with bearing boxes separated on the lines of their center, the removable cap being clamped to that part which is formed on the arm by means of bolts passing through the flanges on the respective parts. Through the middle portion of the yoke a shaft $l$ projects bearing on its inner end a bevel gear wheel $l'$ that is in mesh with a gear wheel $m$ borne on a sleeve that is clamped to the countershaft $j$ by means of a set screw $m'$ or keyed thereto. The gear $m$ is slipped upon the countershaft before the latter is secured in the hangers while the yoke $k$ may be attached to the shaft without removing the latter from its journal boxes. The flexible rod $i$ is made in sections provided at the joints with the ball and socket joints $n$ of any convenient construction that allow the several sections of the shank to be in alignment but hold them so that the rod as a whole will rotate whatever may be the position of the several sections of the rod. In order to enable this connecting rod to be used without regard to the precise position of the machine tool with regard to the countershaft it is made extensible by making a tubular section into which another section of the rod extends a spline or feather being used to hold the parts so that they will rotate together but permits a sliding movement of the one upon the other.

The tool-holder $f$ may be clamped in the usual manner in a turret tool, and with the connections made to a countershaft and boring tool held in the chuck in the outer end of the spindle $g$, is driven at any desired rate of speed depending on the relative proportion of the intermediate gears that form part of the driving mechanism between the countershaft and the drill spindle. By means of this tool I am able to produce a class of work not possible with any of the old appliances.

Instead of securing the end of the spindle $g$ in the turret it may be secured to or terminate in a broadened part forming a slide $o$ adjustably mounted in a base $p$, the latter having a shank $p'$ adapted to be clamped in the turret. The slide $o$ and base $p$ are united by intermeshing tongue and grooved parts in the usual manner and a feed screw $p^2$ provided or other means used to enable the spindle $g$ to be set out of the axial line of the live spindle $c$ of the machine tool. A hole at one side of the axis of the live spindle $c$ may be bored in a piece of work held on the live spindle, or a cutter may be used to shape a cam or eccentric surface on the work. In case an eccentric hole is to be bored the live spindle $c$ is, of course, stopped until the hole is bored and the boring tool removed. In case of the cutting of eccentric surfaces it may not be necessary each time to stop the live spindle of the machine.

The yoke is capable of a swinging movement on the countershaft and forms part of the flexible connection between the countershaft and the tool holding spindle that is removably secured to the turret, the ball and socket joined between the several parts of the rod providing also a part of the flexible connecting means that enable the connection to be made between a countershaft and a machine when the latter is not directly below the countershaft and it also, in connection with the slip joint in the connecting rod, provides means for maintaining the connection between the tool holding spindle in the turret and the countershaft without interfering with the rotary motion of the turret that is required to bring various tools successively into position to operate on the work held in the live spindle of the lathe.

I claim as my invention—

1. In combination in a machine tool having a work holding spindle, a revoluble turret, a base piece removably secured to the turret, a tool holding spindle attached to the base piece and laterally adjustable thereon, and the flexible connecting and driving arm, all substantially as described.

2. In combination in a machine tool having the work holding live spindle $c$, the revoluble turret $e$, a rotary spindle $g$ supported on the turret and provided with means for holding a shaping or boring tool, the flexible and extensible rotary arm $i$ connecting the spindle driving gears on the turret with gears on a counter-shaft, the spindle driving gears $g^2$, $g^3$, supported on the turret, the gear $m$ secured to the counter-shaft $j$, the gear wheel $l$ mounted on the yoke $k$ removably secured to the counter-shaft, and the counter-shaft $j$, all substantially as described.

GEORGE E. WITHERELL.

Witnesses:
CHAS. L. BURDETT,
ARTHUR B. JENKINS.